W. H. BUSSER.
Carriage Top Joint.
No. 86,278. Patented Jan, 26, 1869.
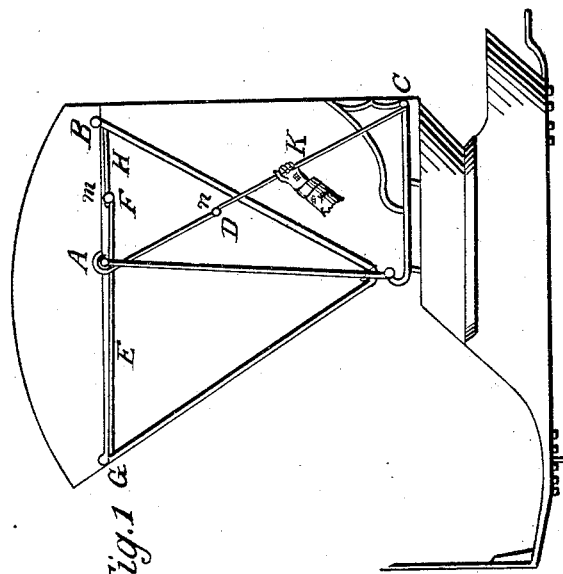
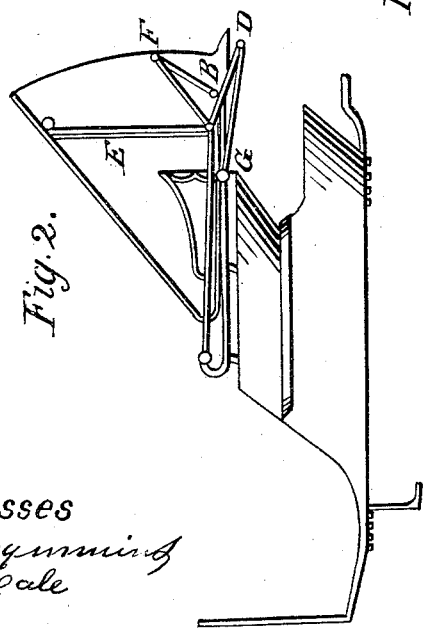
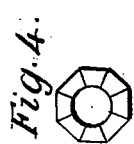
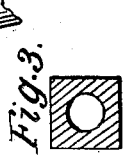
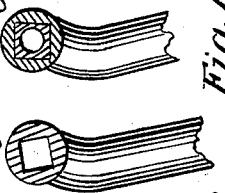
Witnesses
John E Cummings
M. C. Hale
Inventor
Wm H. Busser

WILLIAM H. BUSSER, OF SIDNEY, OHIO.

Letters Patent No. 86,278, dated January 26, 1869.

JOINT FOR CARRIAGE-TOPS.

The Schedule referred to in these Letters Patent and making part of the same.

*To all whom it may concern:*

Be it known that I, WILLIAM H. BUSSER, of Sidney, in the county of Shelby, in the State of Ohio, have invented certain new Improvements in the Construction of Buggy and Carriage-Tops, by which they can be more easily raised and lowered, and will stand more steadily when raised, and by which they will be much less liable to wear, stronger, more easily and cheaply repaired than those now or heretofore known or used; and I do declare that the following is a full and exact description thereof, reference being had to the accompanying drawings, and to the letters of reference marked thereon.

The nature of my invention consists in providing the upper centre joint of buggy and carriage-tops with a thimble, or movable bushing, that shall work within the end of the arms and around the pivot-bolt, protecting the arm from wearing away; and when such thimble becomes worn and loose, it can be easily replaced by a new thimble, the cost of which will be a trifle in comparison with the cost of new arms; and, by this improvement, repairs can be more easily made, and the cost of repairs will be much less, while the whole raising-apparatus will be less liable to get out of order than any other joint now known and in use.

To enable others skilled in the art to make and use my invention, I will proceed to describe its construction and operation.

I construct my arms and joints for buggy or carriage-tops in any of the known forms now in use, with the usual appendages, bolts, &c.; but, in order to obviate the wearing away and the danger of breakage, and the expense of repairs in case of breakage in the main joints, I make a thimble, false journal, boxing, or bushing, to fit into the ends of the arms, and over the pivot-bolt. This thimble, or bushing, moves around the pivot-bolt with the arm, or allows the pivot to move within it, and receives all the wear upon its inner surface, protecting the end of the arm from wearing away, and, in consequence, becoming loose and troublesome, and also less liable to get out of order or to break. I also provide an additional arm, composed of two parts, extending from the centre or middle bow to the back bow of the buggy-top, which stiffens the top, and strengthens the whole structure, and will enable the top to be raised and held firmly in its position without the aid of the back curtains, and enabling a person either to lower or raise the top by simply throwing back out of its seat the upright arm, or to seat it by lifting up the upright arm.

Figure 1, in the accompanying drawing, is a view of the buggy-top when raised.

Figure 2 is a view of fig. 1, top thrown back or down.

Figures 3 and 4 are end views of thimble, boxing, or bushing, square and octagon.

Figure 5 is a side view of the thimble.

Figure 6 is a view without the thimble.

Figure 7 represents the arm, thimble inserted.

Referring to figs. 1 and 2, A is the upper centre or main joint, used in raising or lowering the buggy or carriage-top, and the principal point where the wearing away occurs, and where the thimble will be used. But the thimble may be used in all the other joints in which its use will be expedient.

A B is an additional arm, connecting the back bow at B with the middle bow at the joint A, and having a movable joint at F.

C is the lower joint, connected with A by the upright arms, jointed at D.

E is the arm extending from the front bow G to the centre joint A.

When it is desired to lower or throw back the buggy or carriage-top, place the hand on the arm from C to D, and by a thrust backward and upward, the joint D will be thrown out of the seat, as also the joint at F, which will move upward, thus avoiding the necessity of two movements to lower or raise the top, as in those now known and in use.

Each of the joints H and K is constructed with a projecting lip, as shown in fig. 1, at F. These lips, with the other parts of the arms, form braces, which greatly stiffen and strengthen the arms.

By reference to fig. 2, in the drawings, the positions of the joints with the top thrown down, or back, are represented by the same letters.

I manufacture the arms and joints and buggy-top out of any suitable material, in the manner now known and in use. The thimble may be of iron, steel, or any other suitable hard metal.

What I claim as new, and desire to secure by Letters Patent, is—

1. The stationary non-revolving thimble, when used in the construction of buggy and carriage-tops, constructed substantially as described and set forth.

2. The joints H and K, provided with the projecting lips *m* and *n*, when used in combination with the jointed arms extending from A to B and from A to C, constructed substantially as and for the purpose described.

WM. H. BUSSER.

Witnesses:
M. C. HALE,
MAHLON JONES.